US006264142B1

(12) United States Patent
Voss et al.

(10) Patent No.: US 6,264,142 B1
(45) Date of Patent: Jul. 24, 2001

(54) HELICOPTER DEICING AND ANTI-ICING SYSTEM AND METHOD

(75) Inventors: Timothy H. Voss; Maurice L. Messersmith, both of Fairfield; Darryl K. Ed, Gettysburg, all of PA (US)

(73) Assignee: Agrotors, Inc., Gettysburg, PA (US)

( * ) Notice: Subject to any disclaimer, the term of this patent is extended or adjusted under 35 U.S.C. 154(b) by 0 days.

(21) Appl. No.: 09/459,338

(22) Filed: Dec. 13, 1999

Related U.S. Application Data

(60) Provisional application No. 60/112,076, filed on Dec. 14, 1998.

(51) Int. Cl.$^7$ .............................. B64D 1/00; B64D 15/00
(52) U.S. Cl. ................. 244/136; 244/134 R; 244/134 B
(58) Field of Search ........................... 244/134 R, 134 B, 244/136; 174/5 R, 5 SG, 55 SB

(56) References Cited

U.S. PATENT DOCUMENTS

| | | | |
|---|---|---|---|
| 2,493,017 | 1/1950 | Nutter | 244/136 |
| 2,730,402 | 1/1956 | Whiting, Jr. et al. | 299/30 |
| 2,979,273 * | 4/1961 | Liebhart | 239/550 |
| 3,191,866 | 6/1965 | Wilson | 239/171 |
| 3,523,646 * | 8/1970 | Waldrum | 239/171 |
| 3,897,829 | 8/1975 | Eason | 169/53 |
| 3,920,184 | 11/1975 | Waldrum | 239/10 |
| 4,477,289 | 10/1984 | Kurtgis | 134/34 |
| 4,478,312 * | 10/1984 | Kurtgis | 182/142 |
| 4,637,575 | 1/1987 | Yenzer | 244/118.5 |
| 5,242,133 | 9/1993 | Zwick | 244/134 |
| 5,947,418 * | 9/1999 | Bessiere et al. | 244/134 D |

OTHER PUBLICATIONS

Iceban Product Fac–Toids: "Ice Ban Products are the most important, new discovery in the de–icing industry. They reduce cost and increase safety" Ice Ban America Nov. 9, 1998—http://www.iceban.com/iceban.html.

* cited by examiner

*Primary Examiner*—Charles T. Jordan
*Assistant Examiner*—Christian M. Best
(74) *Attorney, Agent, or Firm*—Nixon Peabody LLP; Daniel W. Sixbey

(57) ABSTRACT

The improved helicopter anti-icing and deicing system and method includes mounting an airfoil shaped manifold transversely of the helicopter and filling the manifold with anti-icing or deicing fluid which is not under sufficient pressure to spray outwardly from the manifold. Instead, the rear edge of the manifold is provided with small, spaced openings which cause fluid droplets to form along the rear edge of the manifold and to then drop downwardly by gravity. The helicopter is positioned above a power line with the power line extending in the direction of the helicopter longitudinal axis and droplets are caused to exit the manifold as the helicopter flies along the power line.

17 Claims, 1 Drawing Sheet

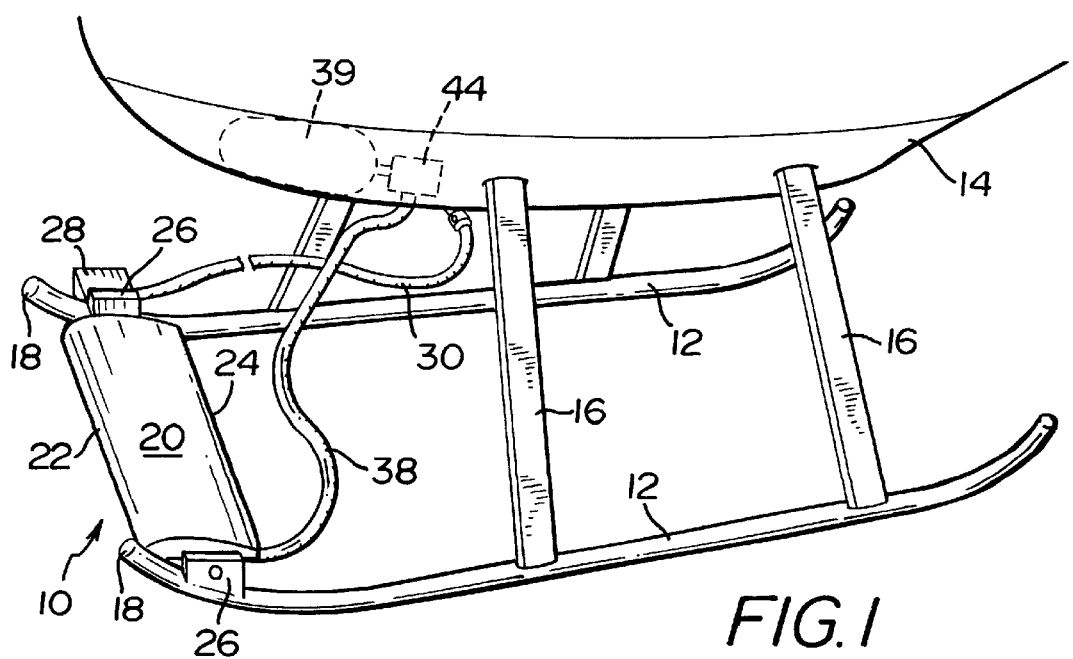
FIG. 1
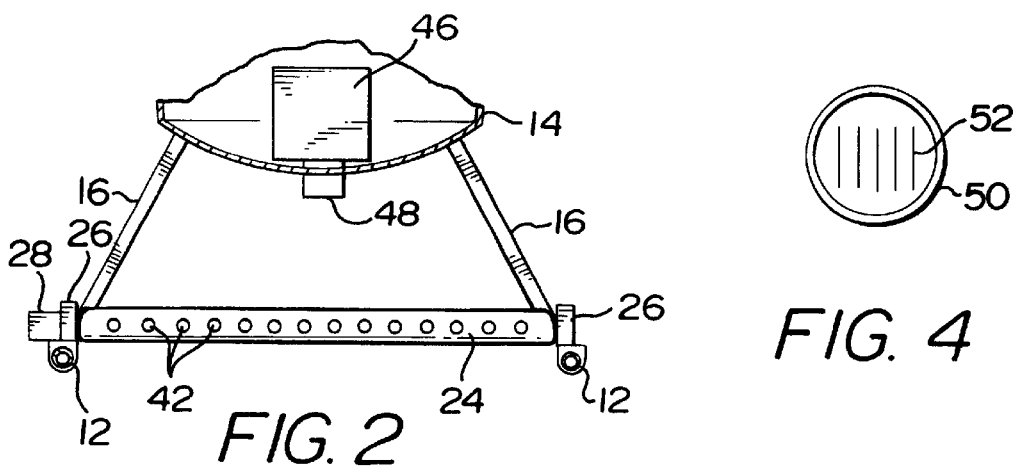
FIG. 2
FIG. 4
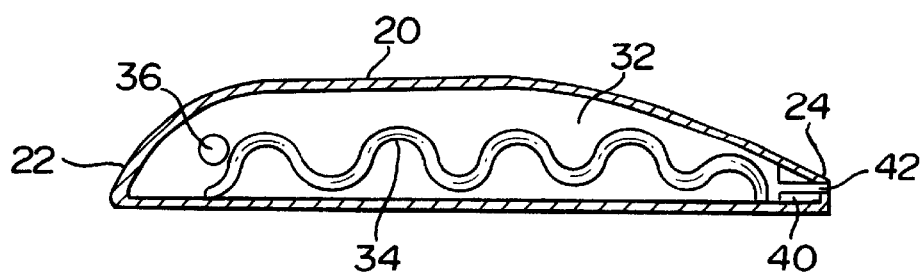
FIG. 3

HELICOPTER DEICING AND ANTI-ICING SYSTEM AND METHOD

This application is a continuation-in-part application of U.S. Ser. No. 60/112,076 filed Dec. 14, 1998.

TECHNICAL FIELD

The present invention relates generally to an anti-icing and deicing system for high voltage power lines, and more particularly to a helicopter mounted anti-icing and deicing system and method.

BACKGROUND OF THE INVENTION

In the past, it has been recognized that high voltage power lines, which generate substantial electrical fields, make repair work extremely difficult. Power lines of this type extend over remote areas that are inaccessible to land vehicles, and the techniques for reaching and servicing these remote high voltage power lines have often been economically disadvantageous, cumbersome and operationally undesirable. To alleviate some of these disadvantages, helicopters provided with associated work platforms mounted directly to the helicopter skid tubes have been devised for supporting a lineman who can then perform the necessary work on a high voltage power line from the hovering helicopter. A system of this type is illustrated by U.S. Pat. No. 4,637,575 to Scott H. Yenzer.

High voltage power lines are especially difficult to inspect and repair in remote areas during winter weather, as a thick coating of ice and snow will often accumulate on the power lines. This can be destructive in that it does damage to conductors and also damage to structures due to the weight of the ice. Removal of this ice and snow accumulation might be accomplished by a lineman supported by the prior art helicopter work platform who manually manipulates a spray nozzle to spray a deicing or anti-icing compound onto the high voltage power line. Prior art spray systems, such as that illustrated in U.S. Pat. No. 4,477,289 to Kurtgis, require that a helicopter fly extremely close to a power line and individually attempt to spray each individual line which is both somewhat hazardous and time consuming. Not only is it difficult to adequately spray each line in a multi-line system but a lineman must be exposed to the elements in order to control the sprayer. This is totally unsatisfactory in cold, windy weather conditions, for the time that a lineman can remain exposed is extremely limited.

Known aircraft borne spray systems, such as those illustrated by U.S. Pat. No. 2,493,017 to Nutter, U.S. Pat. No. 3,410,489 to Waldrum, and U.S. Pat. No. 3,920,184 to Waldrum, are designed to spray material under pressure over wide areas, and these systems do not provide the concentration of material in a very limited and defined area occupied by a power line system to adequately protect the power lines against icing.

Consequently, a need has arisen for a helicopter anti-icing and deicing system and method which operates safely, rapidly and effectively to apply anti-icing or deicing fluid to a multiple power line system without requiring human exposure to the elements.

SUMMARY OF THE INVENTION

It is a primary object of the present invention to provide a novel and improved helicopter anti-icing and deicing system and method for deicing high voltage power lines without requiring human exposure to the elements.

Another object of the present invention is to provide a novel and improved method for deicing high voltage power lines from a helicopter without adversely affecting the aerodynamics of the helicopter in any significant manner and wherein the helicopter maybe positioned with the power lines located in a plane between the helicopter skids so that the anti-icing or deicing material can be dropped by gravity upon the power lines.

A further object of the present invention is to provide a novel and improved helicopter anti-icing and deicing method for a multiple power line system which involves the application of an environmentally friendly natural concentrate residue from the wet milling of corn and the production of alcohol in liquid droplet form by gravity to a power line system. The viscosity of the material is controlled by heating so that micro sized droplets are caused to drop downwardly by gravity within the limited area occupied by the power line system.

Yet another object of the present invention is to provide a novel and improved helicopter anti-icing and deicing method which involves filling a manifold with anti-icing fluid and positioning a helicopter bearing the manifold in spaced relationship above a power line system while orienting the manifold toward a zero angle of attack with the relative wind. Then causing droplets of fluid to drop downwardly from the manifold by gravity in the restricted area occupied by the power line system. The distance of the helicopter above the power line system, the speed of the helicopter relative to the power line system, and compensation of helicopter positioning for cross wind conditions are all employed to limit the coverage area provided by the falling droplets, and to superimpose this coverage area on the power lines.

A further object of the present invention is to provide a novel and improved helicopter anti-icing and deicing system wherein an airfoil shaped manifold structure is pivotally mounted adjacent to the forward tips of the helicopter skids so as to be operative in the undisturbed air in front of the helicopter. The airfoil shaped manifold structure is pivoted to maintain a zero angle of attack with relation to the relative wind to permit droplets of the anti-icing or deicing material from the manifold structure to drop by gravity straight down upon high voltage power lines.

A still further object of the present invention is to provide a novel and improved helicopter anti-icing and deicing system including an airfoil shaped manifold structure pivotally mounted adjacent to the forward tips of the helicopter skids. Anti-icing or deicing fluid is fed from a storage tank into the manifold structure, and the interior of the manifold stricture includes a heating element which is either electrically heated or heated by bleed air from the helicopter turbine. Drops of anti-icing or deicer fluid are ejected through holes formed in the rear surface of the air foil shaped manifold structure and dropped by gravity downwardly onto a high voltage power line when the helicopter is positioned in spaced relation above the power line. It is desirable to maintain droplet sizes in the 2000–5000 micron range as well as a consistent flow, and this is done by providing thermal stabilization of the anti-icing or deicing material.

BRIEF DESCRIPTION OF THE DRAWINGS

FIG. 1 is a perspective view of the helicopter anti-icing and deicing unit of the present invention mounted on the helicopter skid tubes;

FIG. 2 is a rear elevational view of the helicopter anti-icing and deicing unit of FIG. 1;

FIG. 3 is a sectional view of the airfoil shaped manifold for the helicopter anti-icing and deicing unit of FIGS. 1 and 2; and FIG. 4 is a plan view of an optical system viewing lens for the optical system shown in FIG. 3.

DETAILED DESCRIPTION OF THE PREFERRED EMBODIMENTS

Referring now to the drawings, the helicopter anti-icing and deicing system of the present invention indicated generally at 10 is mounted to extend between helicopter skids 12 which are secured beneath a helicopter 14 by skid supports 16. The helicopter anti-icing and deicing system 10 is mounted at the forward end of the helicopter adjacent to the forward tips 18 of the skids 12 so as to be located in the relatively undisturbed air beneath the forward end of the helicopter. This helicopter anti-icing and deicing system includes an elongate airfoil shaped manifold unit 20 having a forward end 22 and a rear end 24. This manifold unit is pivotally mounted upon suitable mounting supports 26 secured to the skids 12. Thus the manifold unit may be pivotally oriented relative to the mounting support 26 and the helicopter skids. This pivotal orientation is controlled by an electric motor 28 mounted on one of the skids 12 and connected to rotate the manifold unit 20. The electric motor receives power and control signals from the helicopter by means of a cable 30. In some cases, the anti-icing and de-icing system will extend forwardly beyond the forward tips of the helicopter skids.

With reference to FIG. 3, it will be noted that the airfoil shaped manifold unit 20 is formed to completely enclose a central chamber 32, and this chamber includes a heating coil 34 which may constitute an electrical heating coil that receives electrical energy over the cable 30 from the helicopter electrical system. Alternatively, the heating coil 34 may include a heat exchanger tube which is connected by a conduit (not shown) to conduct heated bleed air from the helicopter turbine to the heat exchanger coil. The central chamber 32 receives deicing or anti-icing fluid through an opening 36 which is connected to a fluid conduit 38 that extends to a deicing fluid tank 39 carried internally, or externally by the helicopter. At the rear end 24 of the airfoil shaped manifold unit, there is welded an elongate extrusion 40 provided with a plurality of spaced openings that extend across the rear end 24 of the airfoil shaped manifold unit. These openings 42 open along the rear edge of the airfoil shaped manifold unit and cause the fluid from within the central chamber 32 to form droplets as the fluid passes through the openings 42. These droplets then drop by gravity from the rear surface of the manifold unit onto a power line below the helicopter. The openings 42 are sized to provide droplets in the 2000 to 5000 micron range when the viscosity of the fluid is thermally stabilized by the heating coil 34. Ideally, the fluid will be heated to maintain a viscosity of SAE 20 and the openings 42 are sized within a diameter range of sixty to seventy thousandths of an inch.

The airfoil shaped manifold unit 20 will receive and be filled with a deicing compound which is environmentally friendly and non-toxic to vegetation. An ideal deicing compound would be the natural concentrate residue from the wet milling of corn and the production of alcohol provided under the trademark ICE BAN® provided by ICE BAN USA, Inc. of North Palm Beach, Fla. It has been found that this material can be applied as an effective anti-icing and deicing compound as well as an anti-corrosive agent to power lines and power line structures.

The manifold 20 should be kept filled with fluid during the time that fluid is applied to a power line system. To accomplish this, it may be necessary to pump fluid under pressure from the tank 39 through the conduit 38 to the central chamber 32. This pressure should be sufficient to maintain the chamber 32 filled with fluid, but it should not pressurize the fluid within the chamber to an extent that causes the manifold unit 20 to operate as a spray nozzle which sprays fluid outwardly in a horizontal direction behind the manifold unit which will disperse the fluid over a wide area. It has been found that a pump 44 can be provided to pump deicing fluid under a pressure within a range of from twenty to thirty five psi through conduit 38 without causing excessive pressure in the central chamber 32. When this pressure range is maintained, fluid still exits the central chamber as droplets which fall straight down by gravity within the limited area occupied by the power lines when the helicopter is maintained at a controlled distance and speed range above the power lines.

To apply deicing or anti-icing fluid to high voltage power lines in accordance with the method of the present invention, the helicopter 14 is flown into position spaced above the power lines so that the power lines are located between the skids 12 and are substantially parallel to the longitudinal axis of the helicopter. Then the airfoil shaped manifold unit 20 is pivoted to maintain as close as possible a zero angle of attack with relation to the relative wind. Fluid is now provided through the conduit 38 to fill the airfoil shaped manifold unit 20, and this fluid is heated to control the viscosity of the fluid so that it forms droplets as it passes through the openings 42. Since the manifold unit 20 is located in the relatively undisturbed air at the forward end of the helicopter and positioned to maintain a zero angle of attack with relation to the relative wind, the ejection of droplets of deicing fluid from the rear edge of the manifold unit permits these droplets to drop straight down by gravity rather than fanning out as a horizontal spray behind the manifold unit. This causes a high concentration of droplets to fall in the limited area occupied by the power lines, and one or a plurality of power lines within this area are effectively coated with fluid.

In cross wind situations, the wind can deflect the fluid droplets from the power line area, and it is necessary to reorient the helicopter. When it is noted that due to wind, the initial droplet area is missing the power lines, the helicopter is reoriented relative to the power lines to compensate for the cross wind but still with the power lines extending substantially parallel with the longitudinal axis of the helicopter. To aid in accomplishing this reorientation and then maintaining this cross wind compensation position as the helicopter moves along and above the power lines, a video camera 46 or similar optical system having a magnifying zoom lens 48 is mounted on the helicopter for movement sufficient to permit the droplet area at the level of the power lines to be monitored by an observer. When the droplet area is seen to be missing the power lines, the observer can provide directions to the pilot to aid in repositioning the helicopter to compensate for cross winds. The camera or optical unit can be provided with a viewing lens 50 having graduations 52 in degrees to aid the observer in redirecting the helicopter.

Once the helicopter is spaced above the power lines in the fifty to one hundred foot range and is oriented for cross wind compensation if necessary, it is then flown within a speed range of from forty to fifty miles per hour along the power lines while maintaining the spacing range and cross wind compensation orientation as deicing or anti-icing droplets are applied from the manifold 20. The observer constantly monitors the droplet coverage area at power line height and reorients the helicopter to compensate for cross wind changes.

With the present system and method, single or multiple power lines can be effectively, rapidly and concurrently deiced without human exposure to the elements.

We claim:

1. A method for applying anti-icing and deicing to a high voltage power line from a helicopter having spaced skids extending beneath the helicopter from adjacent to a helicopter forward end toward a helicopter rear end which includes:

attaching an elongate manifold unit for receiving said anti-icing or deicing fluid between said helicopter skids, positioning said helicopter in the air spaced above said power line with said power line between said skids and extending in the direction of the longitudinal axis of the helicopter, orienting said manifold toward a zero angle of attack with the relevant wind, heating the anti-icing or deicing fluid within said manifold to control the viscosity thereof, causing said anti-icing or deicing fluid to exit said manifold in droplets which fall downwardly from said manifold by gravity onto said power line, and flying said helicopter along said power line while applying said anti-icing or deicing fluid to said manifold for application to said power line.

2. The method of claim 1 which includes positioning said helicopter within a distance range of from fifty to one hundred feet above said power line and maintaining this distance range while flying the helicopter along the power line.

3. The method of claim 2 wherein said helicopter is flown along said power line at a speed within a range of from forty to fifty miles per hour.

4. A method for applying anti-icing and deicing fluid to a high voltage power line from a helicopter having spaced skids extending beneath the helicopter and an airfoil shaped manifold extending between the helicopter skids which includes:

filling the manifold with a liquid natural concentrate residue formed from the wet milling of corn and the production of alcohol, as an anti-icing and deicing fluid, positioning said helicopter in the air spaced above said power line with said power line between the helicopter skids, and extending in the direction of the longitudinal axis of said helicopter, orienting said airfoil shaped manifold toward a zero angle of attack with the relevant wind, causing said anti-icing or deicing fluid to exit said manifold in droplets and to fall downwardly from said manifold by gravity to form a restricted droplet contained area at the level of said power line, observing the position of said droplet contained area relative to the position of said power line and when said droplet contained area is spaced from the position of said power line adjusting the position of the helicopter to superimpose the droplet contained area over said power line, and flying said helicopter along said power line while causing anti-icing or deicing fluid droplets to continuously exit said airfoil shaped manifold and maintaining the droplet contained area over said power line.

5. The method of claim 4 which includes heating the anti-icing or deicing fluid within said manifold to control the viscosity thereof.

6. The method of claim 5 which includes initially positioning said helicopter within a distance range of from fifty to one hundred feet above said power line and maintaining this distance range as the helicopter flies along said power line.

7. The method of claim 6 which includes flying said helicopter along said power line at a speed within a range of from forty to fifty miles per hour while causing said anti-icing or deicing fluid droplets to exit said airfoil shaped manifold.

8. The method of claim 7 which includes forming anti-icing or deicing fluid droplets at the rear edge of said airfoil shaped manifold with droplet sizes in the 2000–5000 micron range.

9. The method of claim 5 which includes heating the anti-icing or deicing fluid to maintain a viscosity of SAE 20.

10. A method for applying anti-icing and deicing fluid to high voltage power lines from a helicopter which includes:

positioning said helicopter in the air spaced above said power lines with said power lines extending in the direction of the longitudinal axis of said helicopter, causing said anti-icing or deicing fluid to form droplets sized in the 2000 to 5000 micron range along a plane transverse to said helicopter longitudinal axis which drop downwardly by gravity from said helicopter to form a restricted droplet contained area at the level of said power lines, adjusting the position of the helicopter to superimpose the droplet contained area over said power lines, flying said helicopter along said power lines with the power lines substantially parallel to the longitudinal axis of the helicopter while causing anti-icing or deicing fluid droplets to continuously drop downwardly by gravity from said helicopter, and continuously observing the position of said droplet contained area relative to the position of the power lines while flying the helicopter along said power lines and adjusting the position of the helicopter to maintain said droplet contained area superimposed over said power lines.

11. The method of claim 10 which includes positioning said helicopter within a distance range of from fifty to one hundred feet above said power line and maintaining this distance range while flying the helicopter along the power line.

12. The method of claim 11 wherein said helicopter is flown along said power line at a speed within a range of from forty to fifty miles per hour.

13. A method for applying anti-icing and deicing fluid to a high voltage power line from a helicopter having an airfoil shaped manifold extending transverse to the longitudinal axis of the helicopter which includes:

filling the manifold with an anti-icing or deicing fluid, positioning said helicopter in the air spaced above said power line with said power line extending in the direction of the longitudinal axis of said helicopter, orienting said airfoil shaped manifold toward a zero angle of attack with the relevant wind, causing said anti-icing or deicing fluid to form droplets at a rear edge of said manifold and to exit said manifold in droplets so as to fall downwardly from said manifold by gravity to form a restricted droplet contained area at the level of said power line, and flying said helicopter along said power line while causing anti-icing or deicing fluid droplets to exit said airfoil shaped manifold.

14. The method of claim 13 which includes heating said anti-icing or deicing fluid within said manifold.

15. The method of claim 13 which includes initially positioning said helicopter within a distance range of from fifty to one hundred feet above said power line and maintaining this distance range as the helicopter flies along said power line.

16. The method of claim 13 which includes flying said helicopter along said power line at a speed within a range of from forty to fifty miles per hour while causing said anti-icing or deicing fluid droplets to exit said airfoil shaped manifold.

17. The method of claim 13 which includes filling said manifold with a liquid natural concentrate residue formed from the wet milling of corn and the production of alcohol as the anti-icing or deicing fluid.

* * * * *